United States Patent
Weisberger et al.

(10) Patent No.: US 9,607,167 B2
(45) Date of Patent: Mar. 28, 2017

(54) SELF-SERVICE PORTAL FOR TRACKING APPLICATION DATA FILE DISSEMINATION

(71) Applicant: Bank of America Corporation, Charlotte, NC (US)

(72) Inventors: Andrea M. Weisberger, Jacksonville, FL (US); Dale Binder, Dayton, OH (US)

(73) Assignee: Bank of America Corporation, Charlotte, NC (US)

( * ) Notice: Subject to any disclaimer, the term of this patent is extended or adjusted under 35 U.S.C. 154(b) by 331 days.

(21) Appl. No.: 14/217,665

(22) Filed: Mar. 18, 2014

(65) Prior Publication Data

US 2015/0269132 A1 Sep. 24, 2015

(51) Int. Cl.
*G06F 17/00* (2006.01)
*G06F 21/62* (2013.01)
*G06F 17/22* (2006.01)
*G06F 17/24* (2006.01)
*G06F 17/30* (2006.01)
*G06F 3/0482* (2013.01)
*G06F 3/14* (2006.01)

(52) U.S. Cl.
CPC ........ *G06F 21/6218* (2013.01); *G06F 3/0482* (2013.01); *G06F 3/14* (2013.01); *G06F 17/2205* (2013.01); *G06F 17/2235* (2013.01); *G06F 17/2288* (2013.01); *G06F 17/24* (2013.01); *G06F 17/30126* (2013.01); *G06F 17/30165* (2013.01)

(58) Field of Classification Search
CPC ............................. G06F 17/2288; G06F 17/24
USPC ......................... 715/208, 229, 741
See application file for complete search history.

(56) References Cited

U.S. PATENT DOCUMENTS

| | | | |
|---|---|---|---|
| 8,453,258 B2 * | 5/2013 | Weisberger | G06F 21/10 726/20 |
| 2006/0156283 A1 * | 7/2006 | Landau | G06Q 30/02 717/114 |
| 2006/0272031 A1 * | 11/2006 | Ache | G06F 21/10 726/28 |
| 2008/0201159 A1 * | 8/2008 | Gabrick | G06Q 10/10 705/1.1 |
| 2009/0083843 A1 * | 3/2009 | Wilkinson, Jr. | H04L 63/0807 726/9 |
| 2010/0083360 A1 * | 4/2010 | Zhang | G06F 21/32 726/7 |
| 2011/0197133 A1 * | 8/2011 | Tarjan | G06F 17/30864 715/736 |

(Continued)

*Primary Examiner* — Stephen Hong
*Assistant Examiner* — Matthew Ludwig
(74) *Attorney, Agent, or Firm* — Banner & Witcoff, Ltd.; Michael A. Springs

(57) ABSTRACT

A graphical user interface for uploading an application data file may be generated by a computing platform and communicated to a computing device. The computing platform may receive the application data file from the computing device. A graphical user interface comprising a link configured to provide the computing device with access to a modified version of the application data file that comprises an element for tracking dissemination of the application data file may be generated by the computing platform and communicated to the computing device.

4 Claims, 13 Drawing Sheets

(56) References Cited

U.S. PATENT DOCUMENTS

| | | | |
|---|---|---|---|
| 2011/0238430 A1* | 9/2011 | Sikorski | G06Q 10/10 705/1.1 |
| 2012/0102543 A1* | 4/2012 | Kohli | H04L 63/20 726/1 |
| 2014/0067533 A1 | 3/2014 | Gandhi | |
| 2014/0067690 A1 | 3/2014 | Pitroda et al. | |
| 2014/0067691 A1 | 3/2014 | Pitroda et al. | |
| 2014/0067701 A1 | 3/2014 | Humphrey | |
| 2014/0067710 A1 | 3/2014 | Gventer et al. | |
| 2014/0067855 A1 | 3/2014 | Shartzer et al. | |
| 2014/0067856 A1 | 3/2014 | Wicks et al. | |
| 2014/0067958 A1 | 3/2014 | Bradley et al. | |
| 2014/0067980 A1 | 3/2014 | La Rotonda et al. | |
| 2014/0068010 A1 | 3/2014 | Nicholson et al. | |
| 2014/0068252 A1 | 3/2014 | Maruti et al. | |
| 2014/0068400 A1 | 3/2014 | Gulezian et al. | |
| 2014/0068411 A1 | 3/2014 | Ross et al. | |
| 2014/0068431 A1 | 3/2014 | Powers et al. | |
| 2014/0068432 A1 | 3/2014 | Kucharz et al. | |
| 2014/0068635 A1 | 3/2014 | Holzleitner et al. | |
| 2014/0068671 A1 | 3/2014 | Boyer et al. | |
| 2014/0068703 A1 | 3/2014 | Balus et al. | |
| 2014/0068713 A1 | 3/2014 | Nicholson et al. | |
| 2014/0068722 A1 | 3/2014 | Hayat | |
| 2014/0068785 A1* | 3/2014 | Gventer | G06F 21/6245 726/26 |
| 2014/0073417 A1 | 3/2014 | Castle et al. | |
| 2014/0073425 A1 | 3/2014 | Atkinson | |
| 2014/0073880 A1 | 3/2014 | Boucher et al. | |
| 2014/0074179 A1 | 3/2014 | Heldman et al. | |
| 2014/0074180 A1 | 3/2014 | Heldman et al. | |
| 2014/0074553 A1 | 3/2014 | Sullivan | |
| 2014/0074561 A1 | 3/2014 | Deng et al. | |
| 2014/0074562 A1 | 3/2014 | Deng et al. | |
| 2014/0074575 A1* | 3/2014 | Rappoport | G06Q 30/0222 705/14.17 |
| 2014/0074599 A1 | 3/2014 | Rappoport | |
| 2014/0074606 A1 | 3/2014 | Graham et al. | |
| 2014/0074622 A1 | 3/2014 | Doig et al. | |
| 2014/0074654 A1 | 3/2014 | Friedman | |
| 2014/0074678 A1 | 3/2014 | Cunningham et al. | |
| 2014/0074684 A1 | 3/2014 | Cunningham et al. | |
| 2014/0074689 A1 | 3/2014 | Lund et al. | |
| 2014/0074696 A1 | 3/2014 | Glaser | |
| 2014/0074743 A1 | 3/2014 | Rademaker | |
| 2014/0074748 A1 | 3/2014 | Xie | |
| 2014/0074800 A1 | 3/2014 | Gventer et al. | |
| 2014/0074938 A1 | 3/2014 | Deane et al. | |
| 2014/0074952 A1 | 3/2014 | White et al. | |
| 2014/0075004 A1 | 3/2014 | Van Dusen et al. | |
| 2014/0075013 A1 | 3/2014 | Agrawal et al. | |
| 2014/0075029 A1 | 3/2014 | Lipchuk et al. | |
| 2014/0075032 A1 | 3/2014 | Vasudevan et al. | |
| 2014/0075516 A1 | 3/2014 | Chermside | |
| 2014/0075518 A1 | 3/2014 | D'Souza et al. | |
| 2014/0075567 A1 | 3/2014 | Raleigh et al. | |

* cited by examiner

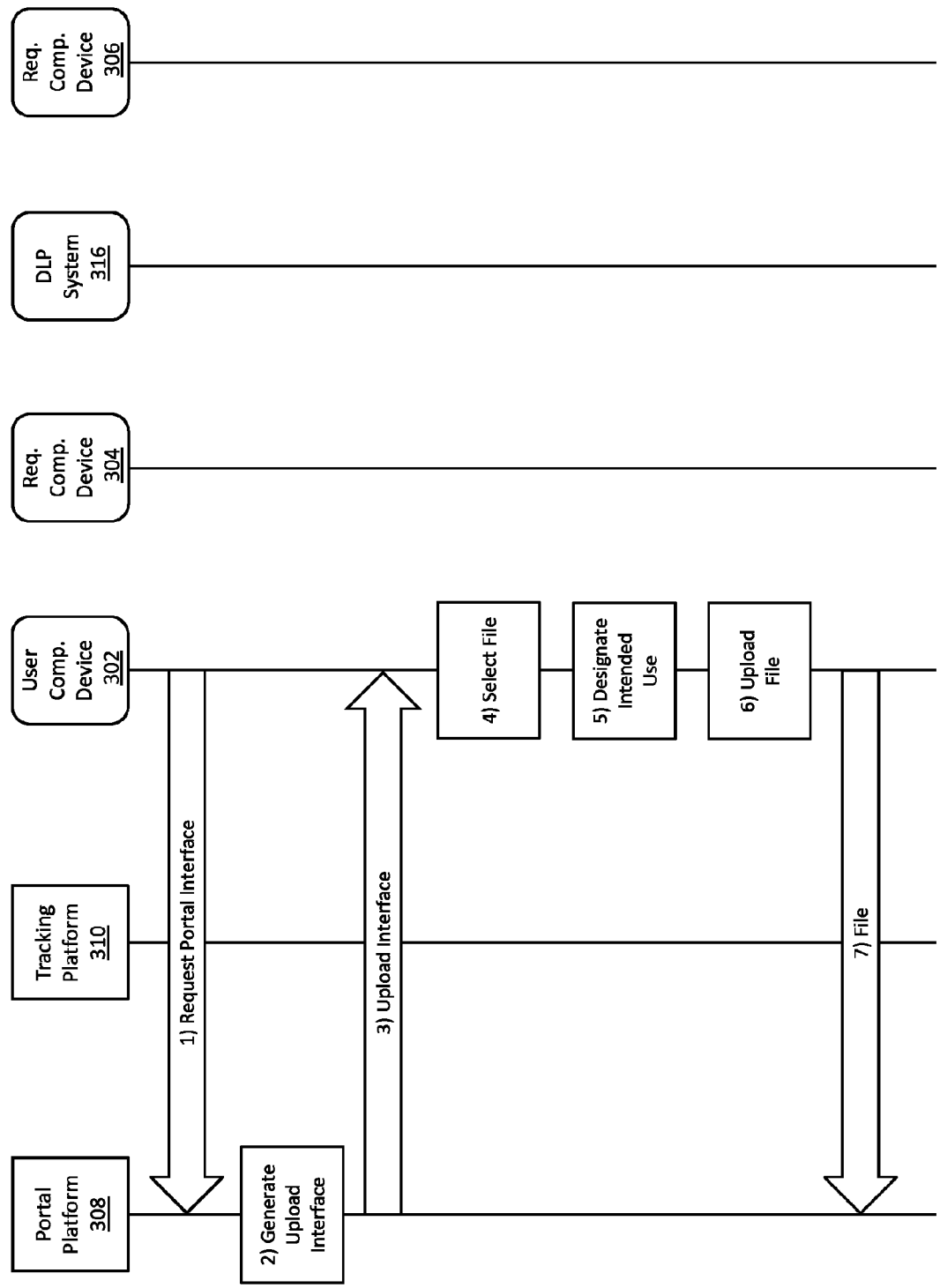

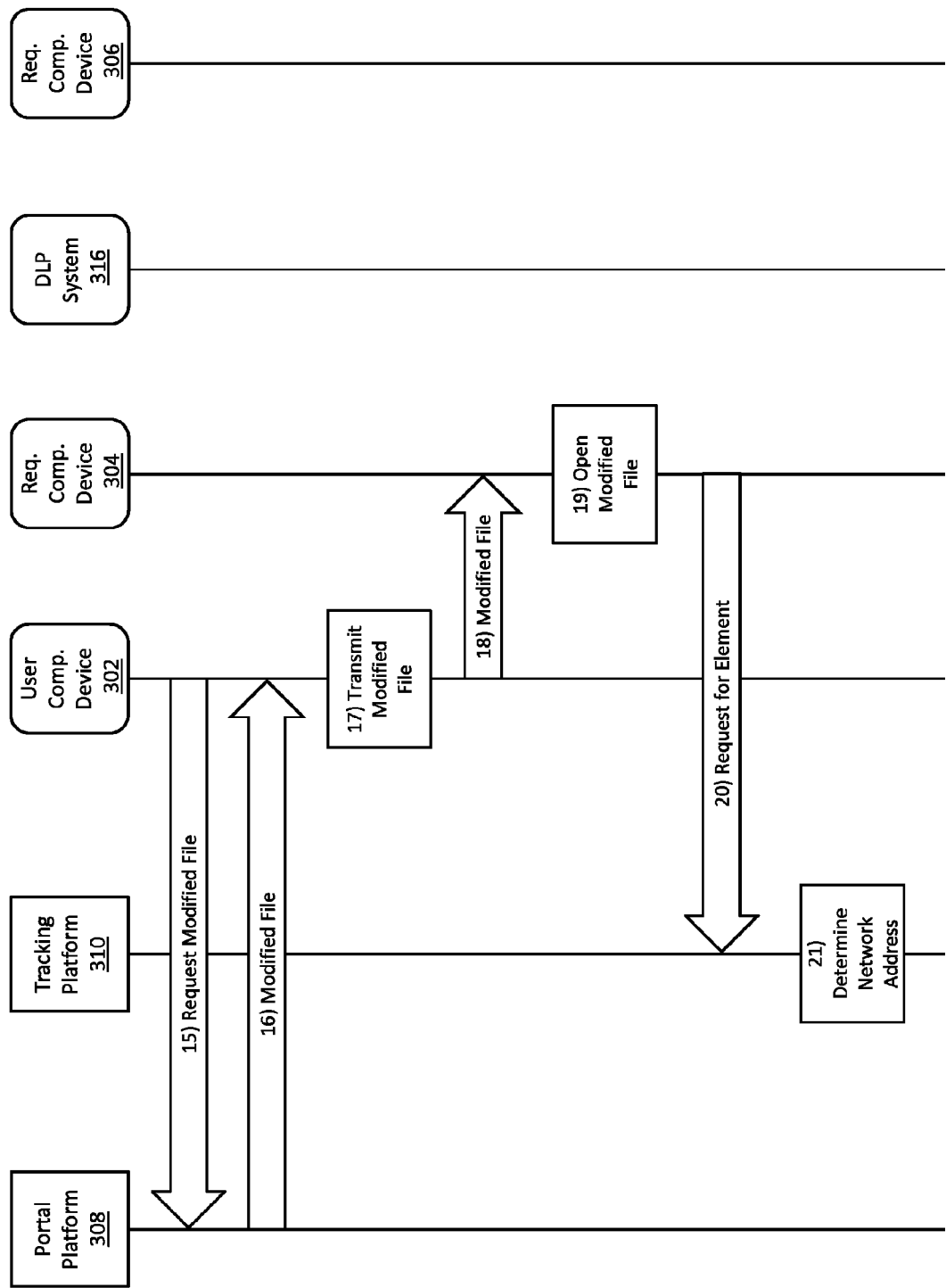

SELF-SERVICE PORTAL FOR TRACKING APPLICATION DATA FILE DISSEMINATION

BACKGROUND

Computer applications are increasingly being utilized by organizations and their employees. Often employees create multiple application data files during a single day. Due to their ubiquity, application data files are commonly exchanged between users (e.g., via email, file transfer protocols, file servers, and the like). Sometimes, however, application data files may contain sensitive, proprietary, and/or confidential data, and an organization or user may desire to monitor or track their dissemination, for example, within the organization and/or externally. Additionally, organizations and/or users may desire to track dissemination of application data files in order to identify consumers of particular types of information (e.g., who within an organization is utilizing information embodied in an application data file). Accordingly, a need exists for a self-service portal for tracking application data file dissemination.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a graphical user interface for uploading an application data file may be generated by a computing platform. The computing platform may communicate the graphical user interface for uploading the application data file to a computing device. The computing platform may receive the application data file from the computing device. A graphical user interface comprising a link configured to provide the computing device with access to a modified version of the application data file that comprises an element for tracking dissemination of the application data file may be generated by the computing platform. The computing platform may communicate the graphical user interface comprising the link configured to provide the computing device with access to the modified version of the application data file that comprises the element for tracking dissemination of the application data file to the computing device.

In some embodiments, the application data file may be a word processor application data file, a spreadsheet application data file, and/or a presentation application data file. In such embodiments, the modified version of the application data file may include the element for tracking dissemination of the application data file and data from the word processor application data file, the spreadsheet application data file, and/or the presentation application data file.

In some embodiments, the computing platform may receive the modified version of the application data file that comprises the element for tracking dissemination of the application data file, and may store the modified version of the application data file that comprises the element for tracking dissemination of the application data file in a storage location corresponding to the link configured to provide the computing device with access to the modified version of the application data file that comprises the element for tracking dissemination of the application data file.

In some embodiments, the computing platform may receive a request generated by invoking the link configured to provide the computing device with access to the modified version of the application data file that comprises the element for tracking dissemination of the application data file from the computing device. Responsive to receiving the request generated by invoking the link configured to provide the computing device with access to the modified version of the application data file that comprises the element for tracking dissemination of the application data file, the computing platform may communicate the modified version of the application data file that comprises the element for tracking dissemination of the application data file from the storage location corresponding to the link configured to provide the computing device with access to the modified version of the application data file that comprises the element for tracking dissemination of the application data file to the computing device.

In some embodiments, the computing platform may determine that the modified version of the application data file that comprises the element for tracking dissemination of the application data file has been communicated to the computing device. Responsive to determining that the modified version of the application data file that comprises the element for tracking dissemination of the application data file has been communicated to the computing device, the computing platform may delete the modified version of the application data file that comprises the element for tracking dissemination of the application data file from the storage location corresponding to the link configured to provide the computing device with access to the modified version of the application data file that comprises the element for tracking dissemination of the application data file.

In some embodiments, generating the graphical user interface for uploading the application data file may include generating a graphical user interface for uploading the application data file that comprises a selectable option for designating whether the application data file is intended for internal use or external use and/or is confidential or proprietary. The computing platform may receive data, generated based on an option selected using the selectable option for designating whether the application data file is intended for internal use or external use and/or is confidential or proprietary, that indicates whether the application data file is intended for internal use or external use and/or is confidential or proprietary. The computing platform may generate, based on the data that indicates whether the application data file is intended for internal use or external use and/or is confidential or proprietary, a request for the modified version of the application data file that comprises the element for tracking dissemination of the application data file. The request for the modified version of the application data file may indicate whether the application data file is intended for internal use or external use and/or is confidential or proprietary.

In some embodiments, the data that indicates whether the application data file is intended for internal use or external use and/or is confidential or proprietary may indicate that the application data file is intended for internal use and/or is confidential or proprietary. In such embodiments, a data leak prevention (DLP) system associated with an organization that is associated with the computing platform may detect outbound data that comprises at least a portion of the element for tracking dissemination of the application data file and that is destined for a network address that is not associated with the organization. Responsive to detecting the outbound data that comprises the at least a portion of the element for tracking dissemination of the application data file and that is destined for the network address that is not associated with the organization, the DLP system associated with the organization may prevent the outbound data that comprises the at least a portion of the element for tracking dissemination of the application data file from being communicated to the network address that is not associated with the organization.

In some embodiments, detecting the outbound data that comprises the at least a portion of the element for tracking dissemination of the application data file and that is destined for the network address that is not associated with the organization may include detecting an email message that comprises the at least a portion of the element for tracking dissemination of the application data file and that is destined for the network address that is not associated with the organization. In such embodiments, preventing the outbound data that comprises the at least a portion of the element for tracking dissemination of the application data file from being communicated to the network address that is not associated with the organization may include preventing transmission of the email message that comprises the at least a portion of the element for tracking dissemination of the application data file and that is destined for the network address that is not associated with the organization to the network address that is not associated with the organization.

Additionally or alternatively, detecting the outbound data that comprises the at least a portion of the element for tracking dissemination of the application data file and that is destined for the network address that is not associated with the organization may include detecting one or more data packets that comprise the at least a portion of the element for tracking dissemination of the application data file and that are destined for the network address that is not associated with the organization. In such embodiments, preventing the outbound data that comprises the at least a portion of the element for tracking dissemination of the application data file from being communicated to the network address that is not associated with the organization may include preventing transmission of the one or more data packets that comprise the at least a portion of the element for tracking dissemination of the application data file and that are destined for the network address that is not associated with the organization to the network address that is not associated with the organization.

In some embodiments, detecting the one or more data packets that comprise the at least a portion of the element for tracking dissemination of the application data file and that are destined for the network address that is not associated with the organization may include utilizing deep packet inspection (DPI) to analyze a plurality of data packets destined for one or more network addresses that are not associated with the organization, and identifying, based on results of the DPI and from amongst the plurality of data packets destined for the one or more network addresses that are not associated with the organization, the one or more data packets that comprise the at least a portion of the element for tracking dissemination of the application data file and that are destined for the network address that is not associated with the organization.

In some embodiments, the computing platform may generate a request for the modified version of the application data file that comprises the element for tracking dissemination of the application data file. The request may include data from the application data file. The computing platform may communicate the request for the modified version of the application data file that comprises the element for tracking dissemination of the application data file to a different computing platform. The different computing platform may receive the request for the modified version of the application data file that comprises the element for tracking dissemination of the application data file, and may generate the modified version of the application data file that comprises the element for tracking dissemination of the application data file. The computing platform may receive the modified version of the application data file that comprises the element for tracking dissemination of the application data file from the different computing platform.

In some embodiments, generating the modified version of the application data file that comprises the element for tracking dissemination of the application data file may include determining, by the different computing platform, an identifier for the application data file, and utilizing, by the different computing platform, the data from the application data file to generate a version of the application data file that comprises: a reference to an element stored on a storage device of the different computing platform, and metadata comprising the identifier for the application data file.

In some embodiments, the different computing platform may receive a request for data associated with the element stored on the storage device of the different computing platform from a requesting computing device. The request may include the identifier for the application data file. The different computing platform may generate a record comprising information associated with the requesting computing device and the identifier for the application data file.

In some embodiments, the different computing platform may determine a network address associated with the requesting computing device. In such embodiments, generating the record comprising the information associated with the requesting computing device and the identifier for the application data file may include generating a record comprising the network address associated with the requesting computing device.

In some embodiments, the different computing platform may generate a request for one or more parameters associated with the requesting computing device. In such embodiments, the different computing platform may receive the one or more parameters associated with the requesting computing device from the requesting computing device, and generating the record comprising the information associated with the requesting computing device and the identifier for the application data file may include generating a record comprising the one or more parameters associated with the requesting computing device.

In some embodiments, generating the request for the one or more parameters associated with the requesting computing device may include generating a request for one or more environment variables of the requesting computing device and/or one or more elements of identifying information stored in a cookie on the requesting computing device. In such embodiments, receiving the one or more parameters associated with the requesting computing device may include receiving the one or more environment variables of the requesting computing device and/or the one or more elements of identifying information stored in the cookie on the requesting computing device, and generating the record comprising the information associated with the requesting computing device and the identifier for the application data file may include generating a record comprising the one or more environment variables of the requesting computing device and/or the one or more elements of identifying information stored in the cookie on the requesting computing device.

In some embodiments, the different computing platform may receive a request for data associated with the element stored on the storage device of the different computing platform from a different requesting computing device. The request may include the identifier for the application data file. The different computing platform may generate a record comprising information associated with the different requesting computing device and the identifier for the application data file.

In some embodiments, the computing platform may receive the information associated with the requesting computing device and the information associated with the different requesting computing device from the different computing platform. The computing platform may receive a request for a report describing dissemination of the application data file from the computing device. Responsive to receiving the request for the report describing dissemination of the application data file, the computing platform may generate a report comprising the information associated with the requesting computing device and the information associated with the different requesting computing device, and may communicate the report comprising the information associated with the requesting computing device and the information associated with the different requesting computing device to the computing device.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIGS. 4A, 4B, 4C, 4D, 4E, and 4F depict an illustrative event sequence for utilizing a self-service portal to track dissemination of an application data file in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
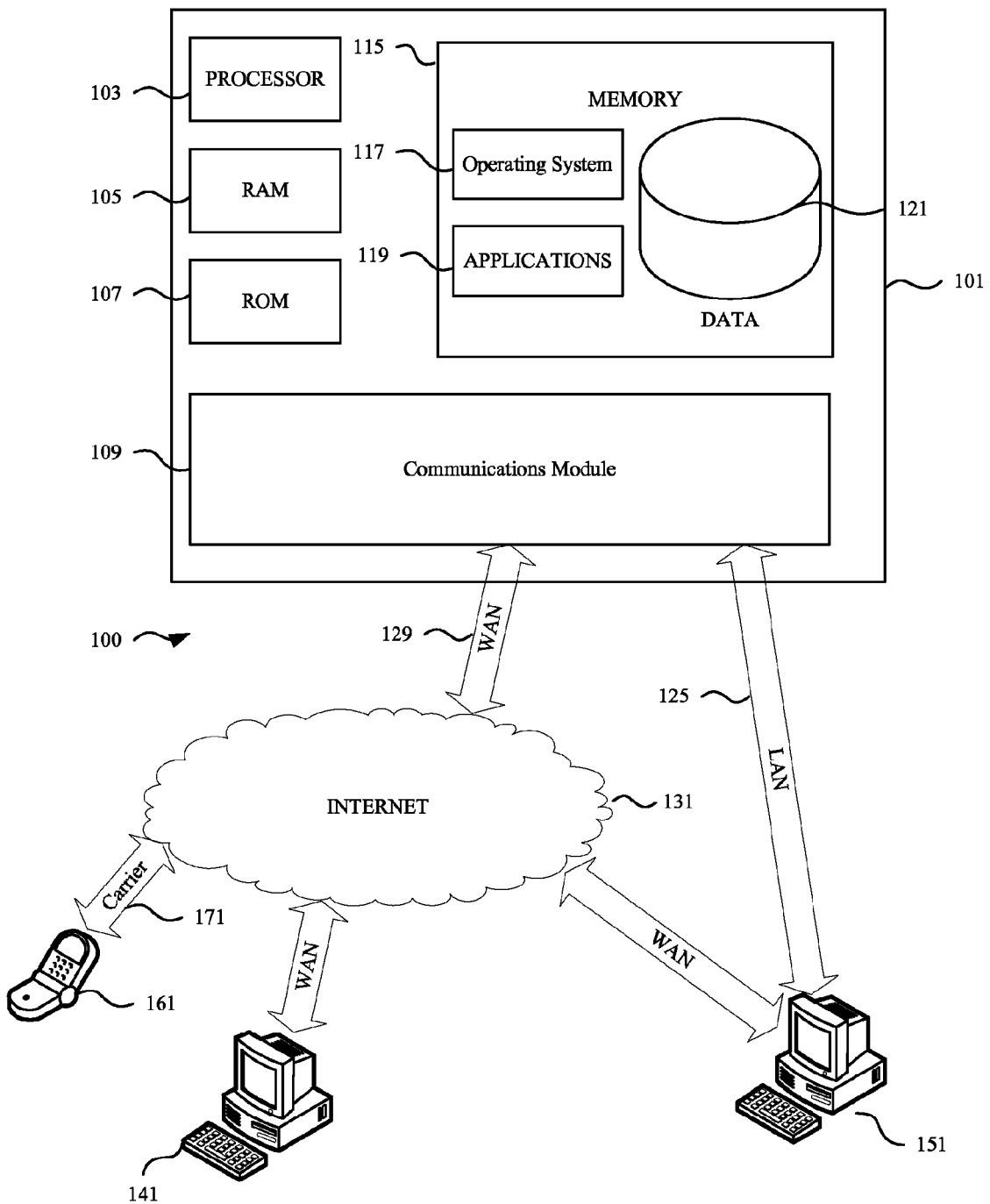
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
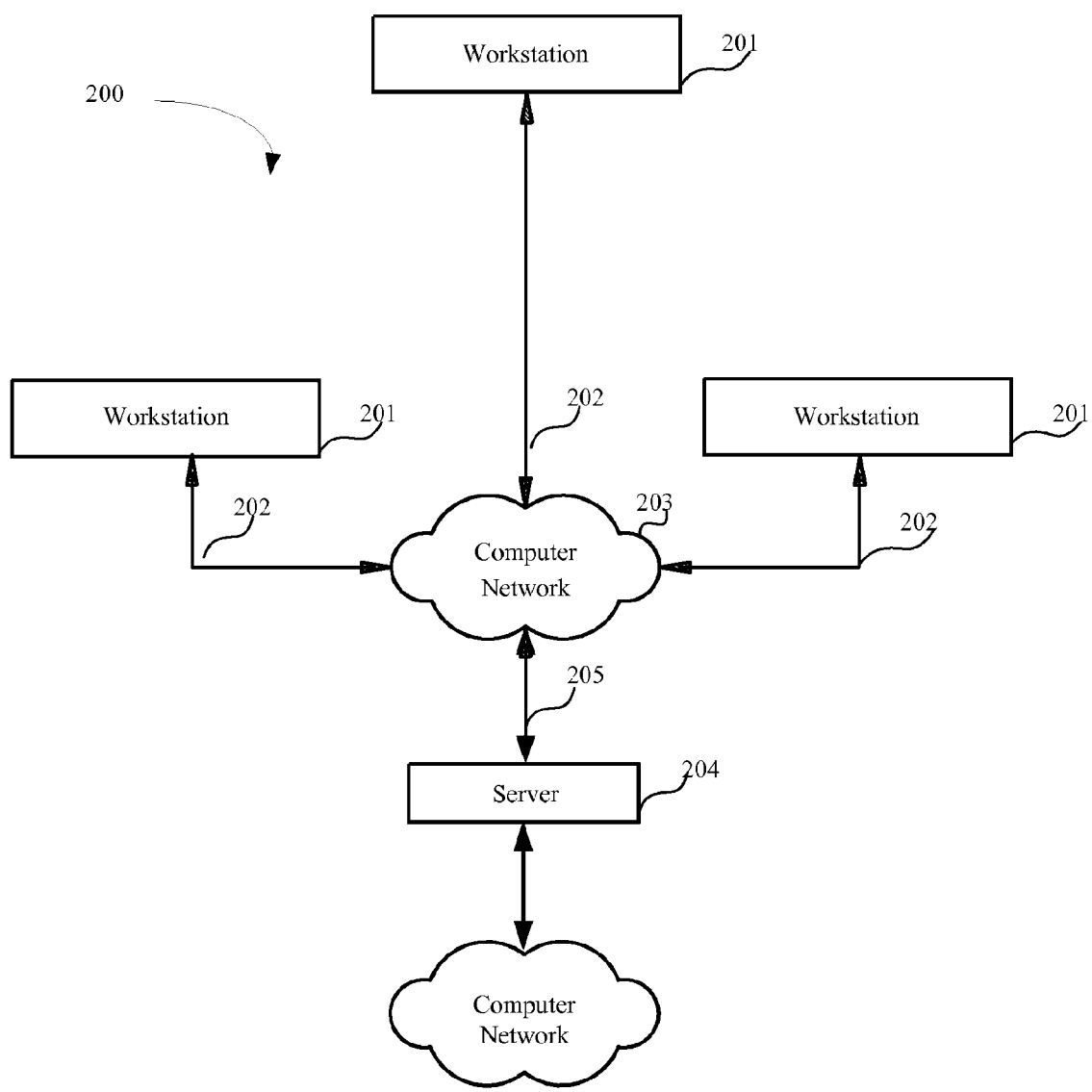
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
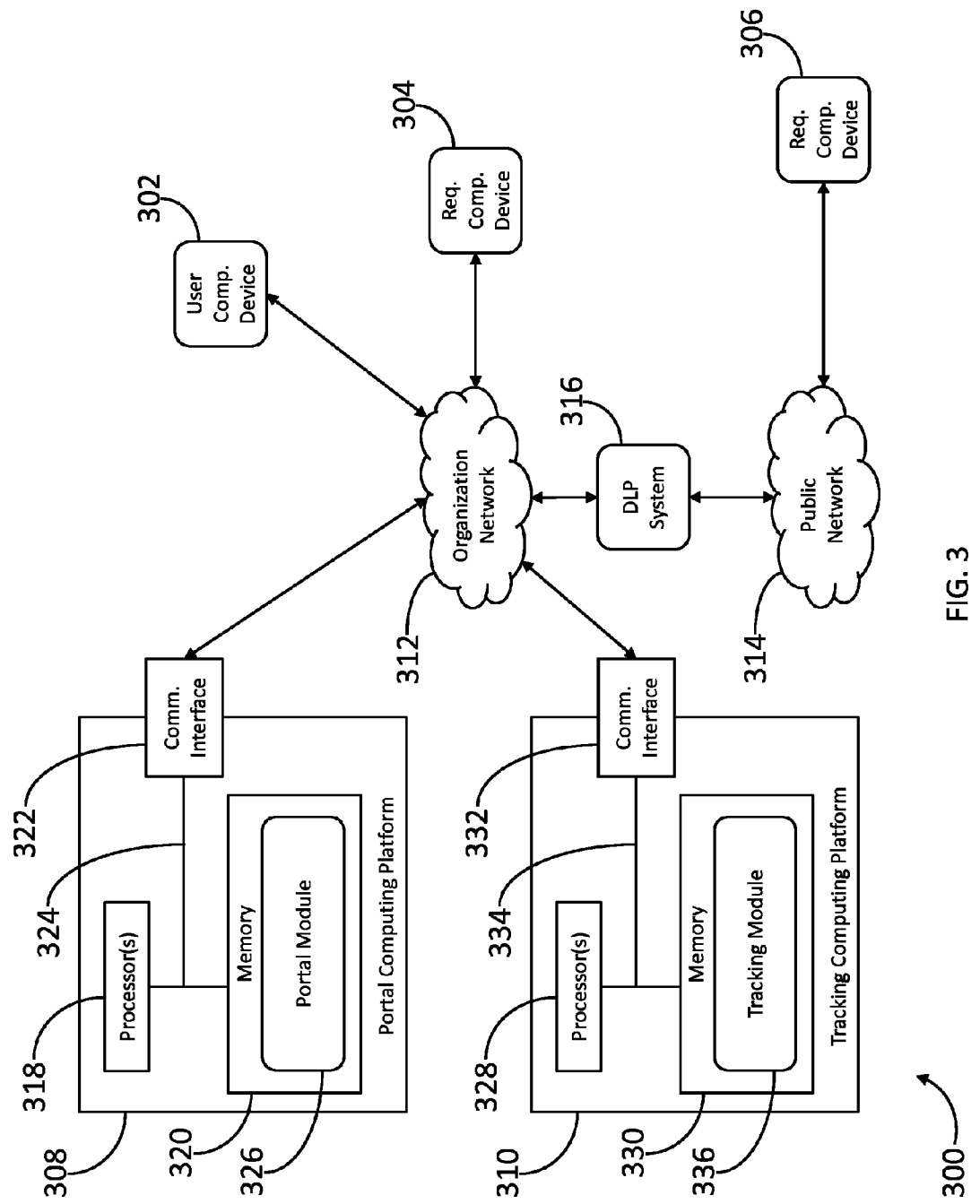
FIG. 3 depicts an illustrative computing environment for operating a self-service portal for tracking application data file dissemination in accordance with one or more example embodiments.

FIG. 3 depicts an illustrative computing environment for operating a self-service portal for tracking application data file dissemination in accordance with one or more example embodiments. Referring to FIG. 3, computing environment 300 may include one or more computing devices. For example, computing environment 300 may include user computing device 302, requesting computing device 304, and requesting computing device 306. User computing device 302, requesting computing device 304, and requesting computing device 306 may be any type of computing device capable of receiving a user interface, receiving input via the user interface, and communicating the received input to one or more other computing devices. For example, user computing device 302, requesting computing device 304, and/or requesting computing device 306 may be a desktop computer, laptop computer, tablet computer, smart phone, or the like. Computing environment 300 may also include one or more computing platforms. For example, computing environment 300 may include portal computing platform 308 and tracking computing platform 310. Portal computing platform 308 and tracking computing platform 310 may include one or more computing devices configured to perform one or more of the functions described herein. For example, portal computing platform 308 and/or tracking computing platform 310 may include one or more computers (e.g., laptop computers, desktop computer, servers, server blades, or the like).

Computing environment 300 may also include one or more networks, which may interconnect one or more of user computing device 302, requesting computing device 304, requesting computing device 306, portal computing platform 308, and/or tracking computing platform 310. For example, computing environment 300 may include organization network 312 and public network 314. Organization network 312 and/or public network 314 may include one or more sub-networks (e.g., LANs, WANs, or the like). Organization network 312 may be associated with a particular organization (e.g., corporation, educational institution, governmental institution, or the like) and may interconnect one or more computing devices associated with the organization.

For example, user computing device 302, requesting computing device 304, portal computing platform 308, and tracking computing platform 310 may be associated with an organization (e.g., a financial institution), and organization network 312 may be associated with and/or operated by the organization, and may include one or more networks (e.g., LANs, WANs, VPNs, or the like) that interconnect user computing device 302, requesting computing device 304, portal computing platform 308, and tracking computing platform 310. Public network 314 may connect organization network 312 and/or one or more computing devices connected thereto (e.g., user computing device 302, requesting computing device 304, portal computing platform 308, and/or tracking computing platform 310) with one or more networks and/or computing devices that are not associated with the organization. For example, requesting computing device 306 may not be associated with an organization that operates and/or is associated with organization network 312, and public network 314 may include one or more networks (e.g., the Internet) that connect requesting computing device 306 to organization network 312 and/or one or more computing devices connected thereto (e.g., user computing device 302, requesting computing device 304, portal computing platform 308, and/or tracking computing platform 310). Computing environment 300 may also include DLP system 316. DLP system 316 may include one or more network and/or computing devices configured to detect specified data and/or prevent the specified data from being transmitted outside organization network 312 (e.g., via public network 314).

Portal computing platform 308 may include one or more processor(s) 318, memory 320, communication interface 322, and data bus 324. Data bus 324 may interconnect processor(s) 318, memory 320, and/or communication interface 322. Communication interface 322 may be a network interface configured to support communication between portal computing platform 308 and organization network 312, or one or more sub-networks thereof. Memory 320 may include one or more program modules comprising instructions that when executed by processor(s) 318 cause portal computing platform 308 to perform one or more functions described herein. For example, memory 320 may include portal module 326, which may comprise instructions that when executed by processor(s) 318 cause portal computing platform 308 to perform one or more functions described herein. Similarly, tracking computing platform 310 may include one or more processor(s) 328, memory 330, communication interface 332, and data bus 334. Data bus 334 may interconnect processor(s) 328, memory 330, and/or communication interface 332. Communication interface 332 may be a network interface configured to support communication between tracking computing platform 310 and organization network 312, or one or more sub-networks thereof. Memory 330 may include one or more program modules comprising instructions that when executed by processor(s) 328 cause tracking computing platform 310 to perform one or more functions described herein. For example, memory 330 may include tracking module 336, which may comprise instructions that when executed by processor(s) 328 cause tracking computing platform 310 to perform one or more functions described herein.

Figure 4B:
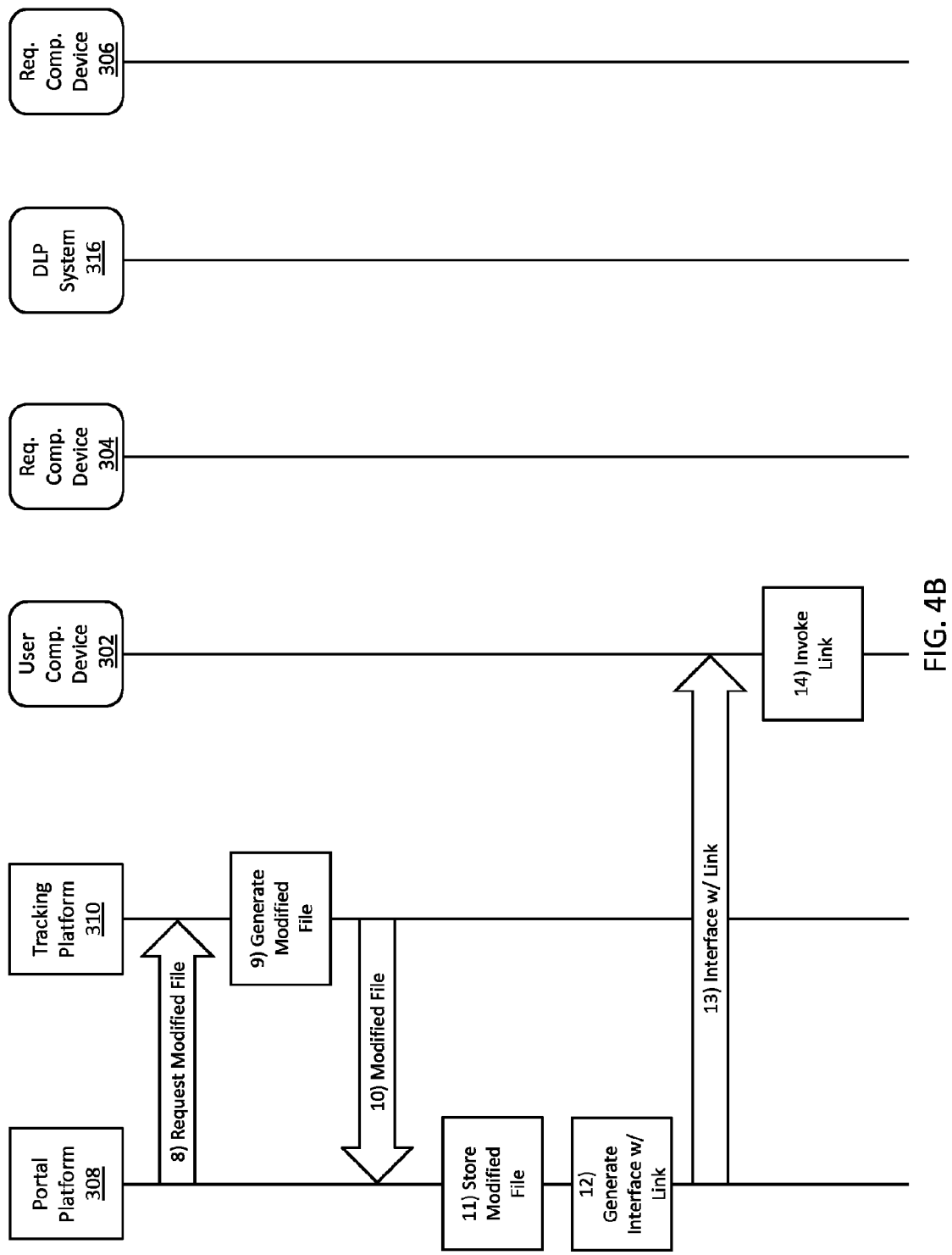

FIGS. 4A, 4B, 4C, 4D, 4E, and 4F depict an illustrative event sequence for utilizing a self-service portal to track dissemination of an application data file in accordance with one or more example embodiments. Referring to FIG. 4A, at step 1, portal computing platform 308 may receive (e.g., via communication interface 322) a request for a graphical user interface for uploading an application data file from user computing device 302. For example, user computing device 302 may navigate an application (e.g., a web browser, mobile application, or the like) to an address or identifier (e.g., a uniform resource identifier (URI), uniform resource locator (URL), or the like) associated with portal computing platform 308. At step 2, portal computing platform 308 may generate a graphical user interface for uploading an application data file. For example, portal computing platform 308 may generate a graphical user interface similar to graphical user interface 500, depicted in FIG. 5. Referring to FIG. 5, graphical user interface 500 may include one or more elements for identifying and/or navigating to an application data file (e.g., an application data file accessible to user computing device 302). For example, graphical user interface 500 may include browse button 502. In some embodiments, graphical user interface 500 may include a selectable option for designating whether the application data file is intended for internal use or external use and/or is confidential or proprietary. For example, graphical user interface 500 may include selectable option 504. Graphical user interface 500 may also include an element for uploading the selected application data file to portal computing platform 308. For example, graphical user interface 500 may include upload button 506.

Returning to FIG. 4A, at step 3, portal computing platform 308 may communicate (e.g., via communication interface 322) the graphical user interface for uploading the application data file (e.g., graphical user interface 500) to user computing device 302. User computing device 302 may receive and render the graphical user interface. At step 4, a user of user computing device 302 may select an application data file (e.g., via browse button 502). At step 5, a user of user computing device 302 may designate whether the selected application data file is intended for internal or external use and/or is confidential or proprietary (e.g., via selectable option 504). At step 6, a user of user computing device 302 may upload the selected application data file to portal computing platform 308 (e.g., by invoking upload button 506). At step 7, user computing device 302 may communicate the application data file to portal computing platform 308, which may receive the application data file (e.g., via communication interface 322). In some embodiments, portal computing platform 308 may receive data, generated based on an option selected using the selectable option for designating whether the application data file is intended for internal use or external use and/or is confidential or proprietary (e.g., selectable option 504) that indicates whether the application data file is intended for internal use or external use and/or is confidential or proprietary.

Referring to FIG. 4B, at step 8, portal computing platform 308 may generate a request for a modified version of the application data file that comprises an element for tracking dissemination of the application data file, and may communicate the request to tracking computing platform 310. The request for the modified version of the application data file that comprises the element for tracking dissemination of the application data file may include data from the application data file. Tracking computing platform 310 may receive the request for the modified version of the application data file that comprises the element for tracking dissemination of the application data file from portal computing platform 308 (e.g., via communication interface 332). As indicated above, in some embodiments, portal computing platform 308 may receive data from user computing device 302 that indicates whether the application data file is intended for internal use or external use and/or is confidential or proprietary. In such embodiments, portal computing platform 308 may generate the request for the modified version of the application data file that comprises the element for tracking dissemination of the application data file based on the data that indicates whether the application data file is intended for internal use or external use and/or is confidential or proprietary, and the request for the modified version of the application data file may indicate whether the application data file is intended for internal use or external use and/or is confidential or proprietary.

Tracking computing platform 310 may receive (e.g., via communication interface 332) the request for the modified version of the application data file that comprises the element for tracking dissemination of the application data file from portal computing platform 308. At step 9, tracking computing platform 310 may generate the modified version of the application data file that comprises the element for tracking dissemination of the application data file. In some embodiments, generating the modified version of the application data file that comprises the element for tracking dissemination of the application data file may include determining, by tracking computing platform 310, an identifier for the application data file (e.g., a unique identifier that corresponds to the application data file), and utilizing, by tracking computing platform 310, the data from the application data file to generate a version of the application data file that comprises: a reference to an element stored on a storage device of tracking computing platform 310, and metadata comprising the identifier for the application data file. For example, in some embodiments, the application data file may be a word processor application data file, a spreadsheet application data file, and/or a presentation application data file. In such embodiments, tracking computing platform 310 may generate a modified version of the application data file that includes data from the word processor application data file, the spreadsheet application data file, and/or the presentation application data file, as well as one or more elements for tracking dissemination of the application data file (e.g., a reference to an element stored on tracking computing platform 310 and/or an identifier for the application data file). At step 10, tracking computing platform 310 may communicate (e.g., via communication interface 332) the modified version of the application data file that comprises the element for tracking dissemination of the application data file to portal computing platform 308.

Figure 6:
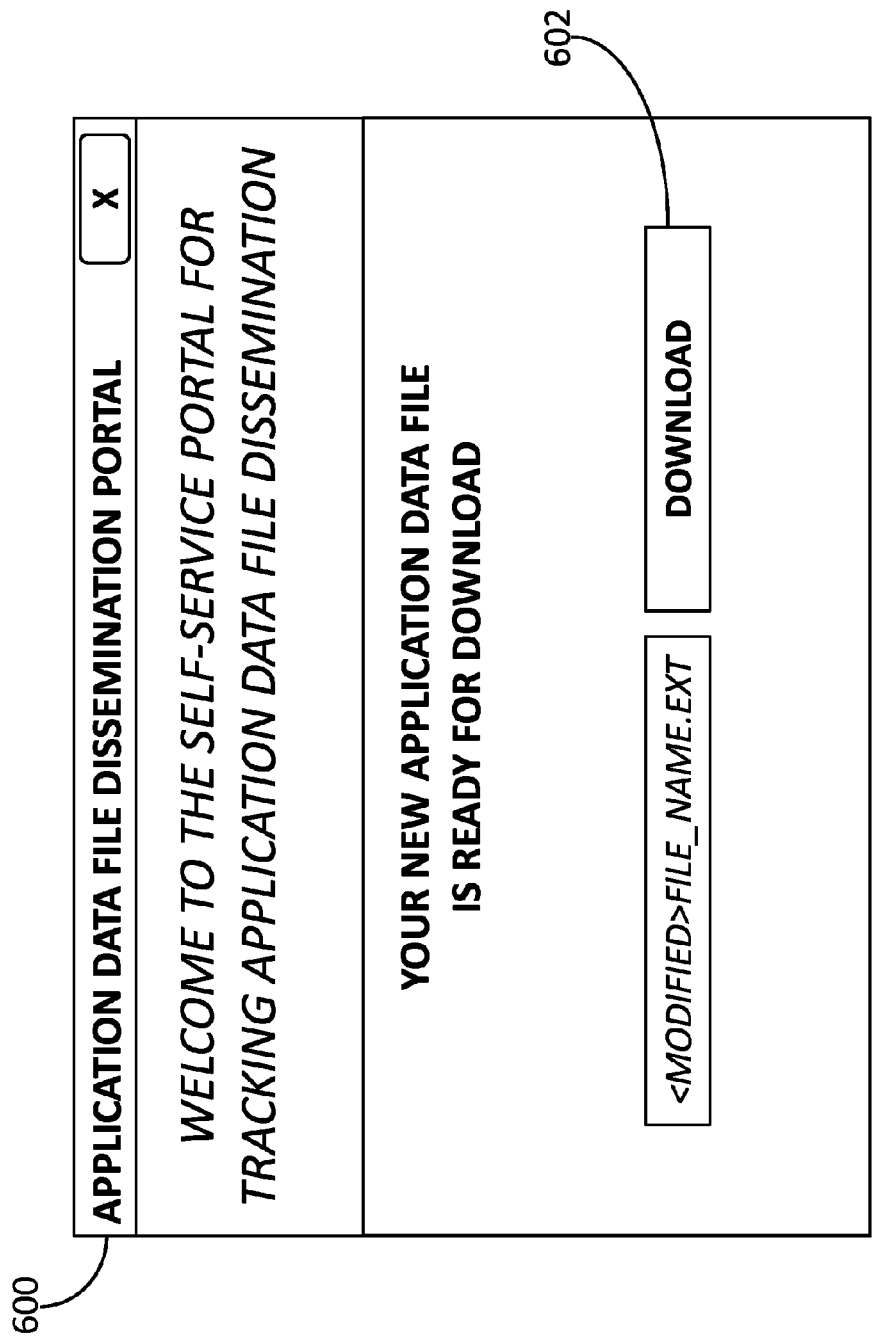
FIG. 6 depicts an example graphical user interface for downloading an application data file from a self-service portal for tracking application data file dissemination in accordance with one or more example embodiments.

Portal computing platform 308 may receive (e.g., via communication interface 322) the modified version of the application data file that comprises the element for tracking dissemination of the application data file from tracking computing platform 310, and, at step 11, may store the modified version of the application data file that comprises the element for tracking dissemination of the application data file in a storage location. At step 12, portal computing platform 308 may generate a graphical user interface comprising a link configured to provide user computing device 302 with access to the modified version of the application data file that comprises the element for tracking dissemination of the application data file. For example, portal computing platform 308 may generate a graphical user interface similar to graphical user interface 600, depicted in FIG. 6. Referring to FIG. 6, graphical user interface 600 may include download button 602, which may comprise a link configured to provide user computing device 302 with access to the modified version of the application data file that comprises the element for tracking dissemination of the application data file (e.g., a link corresponding to the storage location where portal computing platform 308 stored the modified version of the application data file that comprises the element for tracking dissemination of the application data file).

Returning to FIG. 4B, at step 13, portal computing platform 308 may communicate (e.g., via communication interface 322) the graphical user interface comprising the link configured to provide user computing device 302 with access to the modified version of the application data file that comprises the element for tracking dissemination of the application data file (e.g., graphical user interface 600) to user computing device 302. At step 14, a user of user computing device 302 may invoke the link configured to provide user computing device 302 with access to the modified version of the application data file that comprises the element for tracking dissemination of the application data file (e.g., download button 602), and, referring to FIG. 4C, at step 15, user computing device 302 may communicate a request, based on invocation of the link, for the modified version of the application data file that comprises the element for tracking dissemination of the application data file. Portal computing platform 308 may receive (e.g., via communication interface 322) the request for the modified version of the application data file that comprises the element for tracking dissemination of the application data file, and, at step 16, responsive to receiving the request from user computing device 302, may communicate (e.g., via communication interface 322) the modified version of the application data file that comprises the element for tracking dissemination of the application data file to user computing device 302 (e.g., from the storage location). In some embodiments, portal computing platform 308 may determine that the modified version of the application data file that comprises the element for tracking dissemination of the application data file has been communicated to user computing device 302. Responsive to determining that the modified version of the application data file that comprises the element for tracking dissemination of the application data file has been communicated to user computing device 302, portal computing platform 308 may delete the modified version of the application data file that comprises the element for tracking dissemination of the application data file from the storage location corresponding to the link configured to provide user computing device 302 with access to the modified version of the application data file that comprises the element for tracking dissemination of the application data file.

At step 17, a user of user computing device 302 may transmit the modified version of the application data file that comprises the element for tracking dissemination of the application data file. For example, a user of user computing device 302 may send an email that includes the modified version of the application data file that comprises the element for tracking dissemination of the application data file to a user associated with requesting computing device 304. Additionally or alternatively, a user of user computing device 302 may utilize a file transfer protocol to transmit the modified version of the application data file that comprises the element for tracking dissemination of the application data file to requesting computing device 304, and/or a user of user computing device 302 may move/copy the modified version of the application data file that comprises the element for tracking dissemination of the application data file to a storage device (e.g., a network server, appliance, or the like) accessible to requesting computing device 304. At step 18, the modified version of the application data file that comprises the element for tracking dissemination of the application data file may be communicated to requesting computing device 304.

At step 19, a user of requesting computing device 304 may open the modified version of the application data file that comprises the element for tracking dissemination of the application data file. As indicated above, in some embodiments, the modified version of the application data file that comprises the element for tracking dissemination of the application data file may include a reference to an element stored on a storage device of tracking computing platform 310. An application executing on requesting computing device 304 (e.g., an application configured to open the application data file) may recognize the reference to the element stored on the storage device of tracking computing platform 310, requesting computing device 304 may generate a request for data associated with the element stored on the storage device of tracking computing platform 310, and, at step 20, requesting computing device 304 may communicate the request for the data associated with the element stored on the storage device of tracking computing platform 310 to tracking computing platform 310, which may receive the request (e.g., via communication interface 332). In some embodiments, the request for the data associated with the element stored on the storage device of tracking computing platform 310 may include the identifier for the application data file. At step 21, tracking computing platform 310 may determine a network address (e.g., an IP address) associated with requesting computing device 304 (e.g., based on the request for the data associated with the element stored on the storage device of tracking computing platform 310).

Figure 4D:
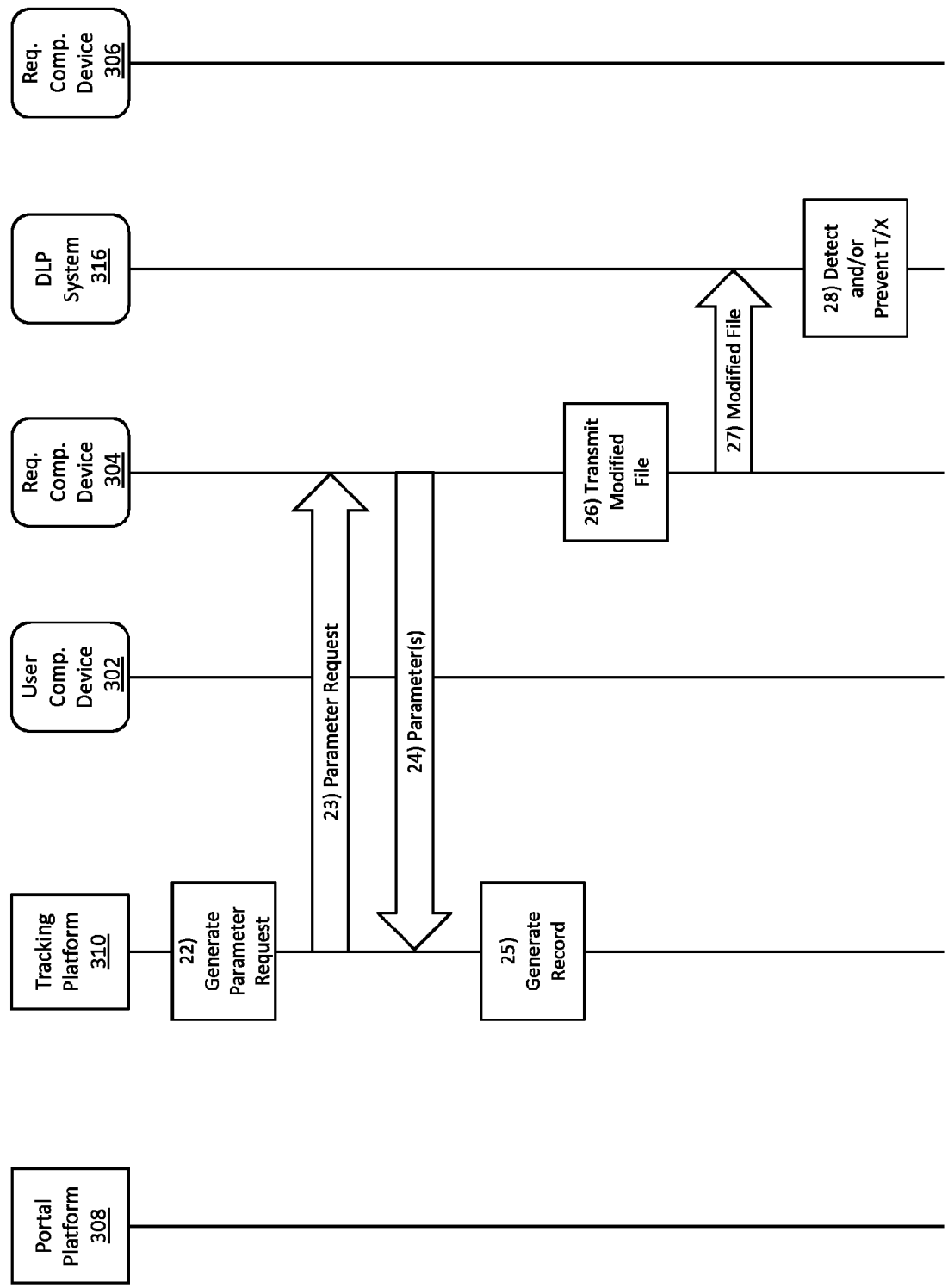
Figure 5:
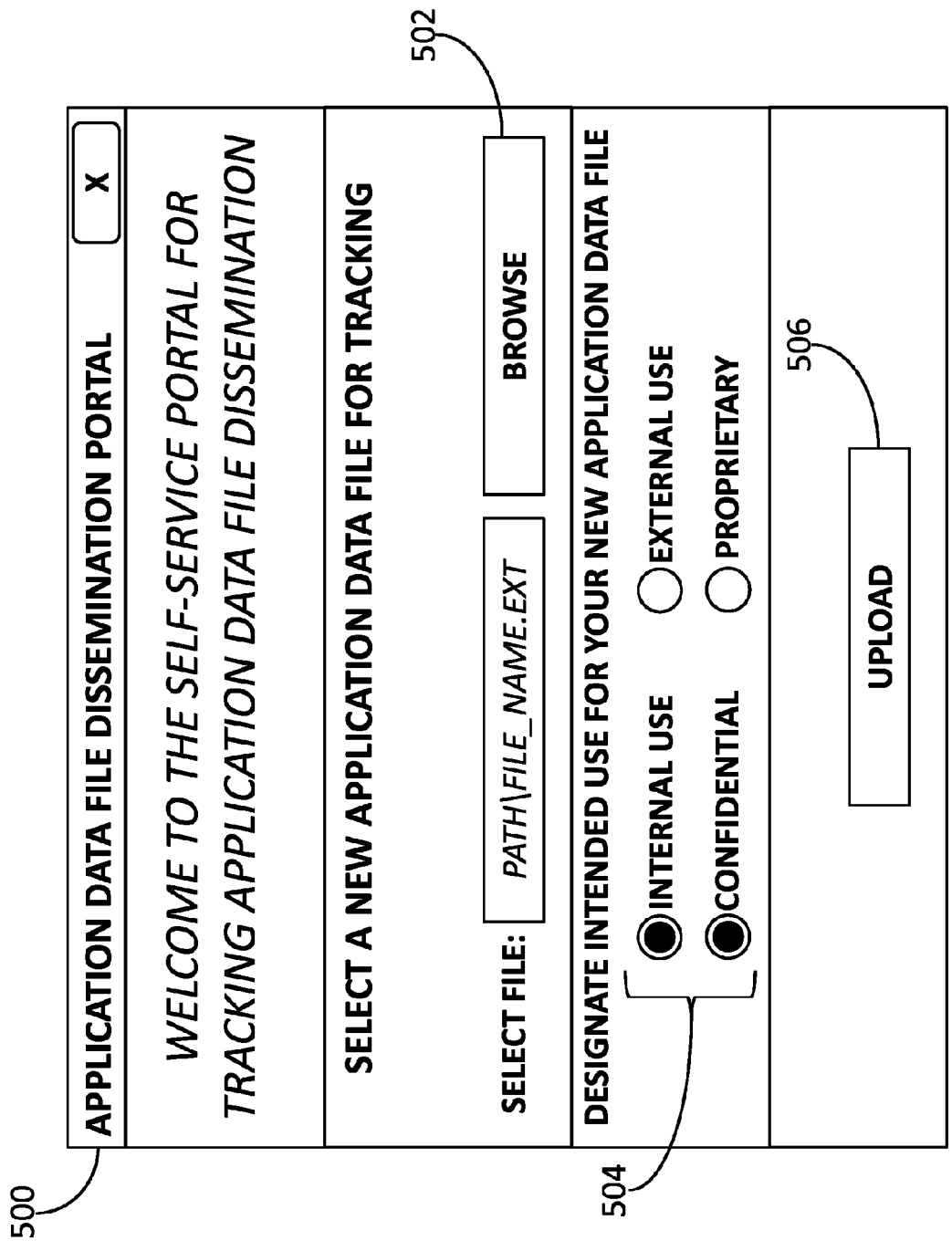
FIG. 5 depicts an example graphical user interface for uploading an application data file to a self-service portal for tracking application data file dissemination in accordance with one or more example embodiments.

Referring to FIG. 4D, at step 22, tracking computing platform 310 may generate a request for one or more parameters associated with requesting computing device 304, and, at step 23, may communicate (e.g., via communication interface 332) the request for the one or more parameters associated with requesting computing device 304 to requesting computing device 304. In some embodiments, the request for the one or more parameters associated with requesting computing device 304 may include a request for one or more environment variables (e.g., type of web browser being utilized by requesting computing device 304) of requesting computing device 304 and/or one or more elements of identifying information stored in a cookie on requesting computing device 304. Requesting computing device 304 may receive the request for the one or more parameters associated with requesting computing device 304, may generate a response comprising at least a portion of the requested parameter(s), and, at step 24, may communicate the parameter(s) to tracking computing platform 310. Tracking computing platform 310 may receive (e.g., via communication interface 332) the parameter(s) from requesting computing device 304, and at step 25, may generate a record associated with requesting computing device 304. The record may include a date/time stamp indicating the date and/or time of the request, the identifier for the application data file, and/or information associated with requesting computing device 304 (e.g., the network address associated with requesting computing device 304, and/or the parameters associated with requesting computing device 304 (e.g., the one or more environment variables of requesting computing device 304 and/or the one or more elements of identifying information stored in the cookie on requesting computing device 304)).

At step 26, a user of requesting computing device 304 may transmit the modified version of the application data file that comprises the element for tracking dissemination of the application data file. For example, a user of requesting computing device 304 may send an email that includes the modified version of the application data file that comprises the element for tracking dissemination of the application data file to a user associated with requesting computing device 306. Additionally or alternatively, a user of requesting computing device 304 may utilize a file transfer protocol to transmit the modified version of the application data file that comprises the element for tracking dissemination of the application data file to requesting computing device 306, and/or a user of requesting computing device 304 may move/copy the modified version of the application data file that comprises the element for tracking dissemination of the application data file to a storage device (e.g., a network server, appliance, or the like) accessible to requesting computing device 306.

At step 27, the modified version of the application data file that comprises the element for tracking dissemination of the application data file may be communicated toward requesting computing device 306 (e.g., via organization network 312). As indicated above (e.g., with respect to step 5), in some embodiments, the user of user computing device 302 may have indicated that the application data file is intended for internal use and/or is confidential or proprietary (e.g., via selectable option 504). In such embodiments, at step 28, DLP system 316 may detect outbound data that comprises at least a portion of the element for tracking dissemination of the application data file and that is destined for a network address that is not associated with the organization. For example, DLP system 316 may detect an email message that comprises the at least a portion of the element for tracking dissemination of the application data file and that is destined for the network address that is not associated with the organization (e.g., a network address associated with requesting computing device 306 and/or public network 314) and/or one or more data packets that comprise the at least a portion of the element for tracking dissemination of the application data file and that are destined for the network address that is not associated with the organization (e.g., a network address associated with requesting computing device 306 and/or public network 314). In some embodiments, detecting the one or more data packets that comprise the at least a portion of the element for tracking dissemination of the application data file and that are destined for the network address that is not associated with the organization may include utilizing deep packet inspection (DPI) to analyze a plurality of data packets destined for one or more network addresses that are not associated with the organization, and identifying, based on results of the DPI and from amongst the plurality of data packets destined for the one or more network addresses that are not associated with the organization, the one or more data packets that comprise the at least a portion of the element for tracking dissemination of the application data file and that are destined for the network address that is not associated with the organization.

Responsive to detecting the outbound data that comprises the at least a portion of the element for tracking dissemination of the application data file and that is destined for the network address that is not associated with the organization, DLP system 316 may prevent the outbound data that comprises the at least a portion of the element for tracking dissemination of the application data file from being communicated to the network address that is not associated with the organization. For example, DLP system 316 may prevent transmission of the email message that comprises the at least a portion of the element for tracking dissemination of the application data file and that is destined for the network address that is not associated with the organization to the network address that is not associated with the organization (e.g., the network address associated with requesting computing device 306 and/or public network 314) and/or may prevent transmission of the one or more data packets that comprise the at least a portion of the element for tracking dissemination of the application data file and that are destined for the network address that is not associated with the organization to the network address that is not associated with the organization (e.g., the network address associated with requesting computing device 306 and/or public network 314).

Figure 4E:
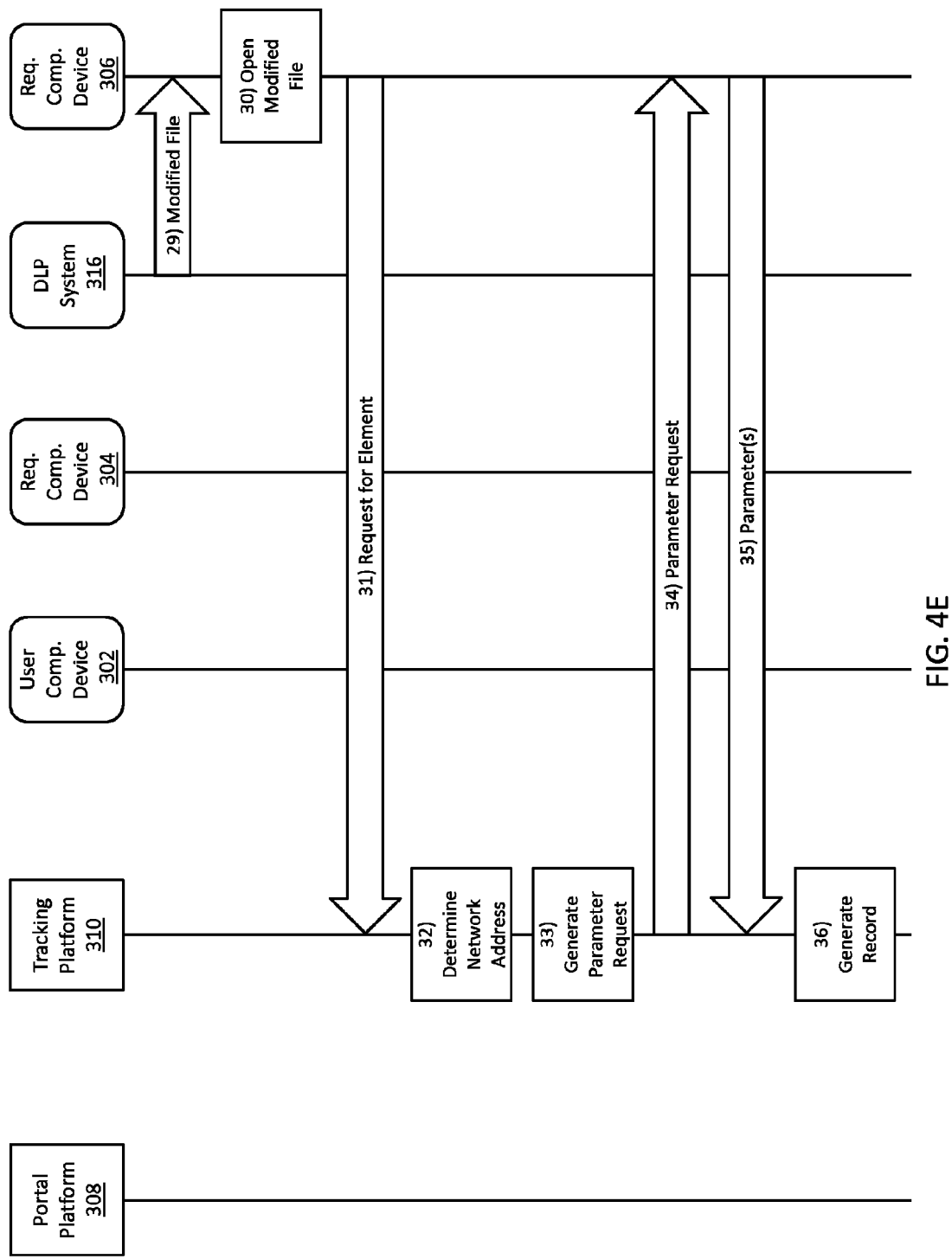

In the event that DLP system 316 does not prevent the outbound data that comprises the at least a portion of the element for tracking dissemination of the application data file from being communicated to the network address that is not associated with the organization (e.g., the user of user computing device indicted that the application data file is intended for external use and/or the DLP system failed to detect and/or prevent transmission of the outbound data comprising the at least a portion of the element for tracking dissemination of the application data file), referring to FIG. 4E, at step 29, the modified version of the application data file that comprises the element for tracking dissemination of the application data file may be communicated to requesting computing device 306 (e.g., via public network 314). At step 30, a user of requesting computing device 306 may open the modified version of the application data file that comprises the element for tracking dissemination of the application data file. As indicated above, in some embodiments, the modified version of the application data file that comprises the element for tracking dissemination of the application data file may include a reference to an element stored on a storage device of tracking computing platform 310. An application executing on requesting computing device 306 (e.g., an application configured to open the application data file) may recognize the reference to the element stored on the storage device of tracking computing platform 310, requesting computing device 306 may generate a request for data associated with the element stored on the storage device of tracking computing platform 310, and, at step 31, requesting computing device 306 may communicate the request for the data associated with the element stored on the storage device of tracking computing platform 310 to tracking computing platform 310, which may receive the request (e.g., via communication interface 332). In some embodiments, the request for the data associated with the element stored on the storage device of tracking computing platform 310 may include the identifier for the application data file. At step 32, tracking computing platform 310 may determine a network address (e.g., an IP address) associated with requesting computing device 306 (e.g., based on the request for the data associated with the element stored on the storage device of tracking computing platform 310).

At step 33, tracking computing platform 310 may generate a request for one or more parameters associated with requesting computing device 306, and, at step 34, may communicate (e.g., via communication interface 332) the request for the one or more parameters associated with requesting computing device 306 to requesting computing device 306. In some embodiments, the request for the one or more parameters associated with requesting computing device 306 may include a request for one or more environment variables of requesting computing device 306 and/or one or more elements of identifying information stored in a cookie on requesting computing device 306. Requesting computing device 306 may receive the request for the one or more parameters associated with requesting computing device 306, may generate a response comprising at least a portion of the requested parameter(s), and, at step 35, may communicate the parameter(s) to tracking computing platform 310. Tracking computing platform 310 may receive (e.g., via communication interface 332) the parameter(s) from requesting computing device 306, and at step 36, may generate a record associated with requesting computing device 306. The record may include a date/time stamp indicating the date and/or time of the request, the identifier for the application data file, and/or information associated with requesting computing device 306 (e.g., the network address associated with requesting computing device 306, and/or the parameters associated with requesting computing device 306 (e.g., the one or more environment variables of requesting computing device 306 and/or the one or more elements of identifying information stored in the cookie on requesting computing device 306)).

Figure 4F:
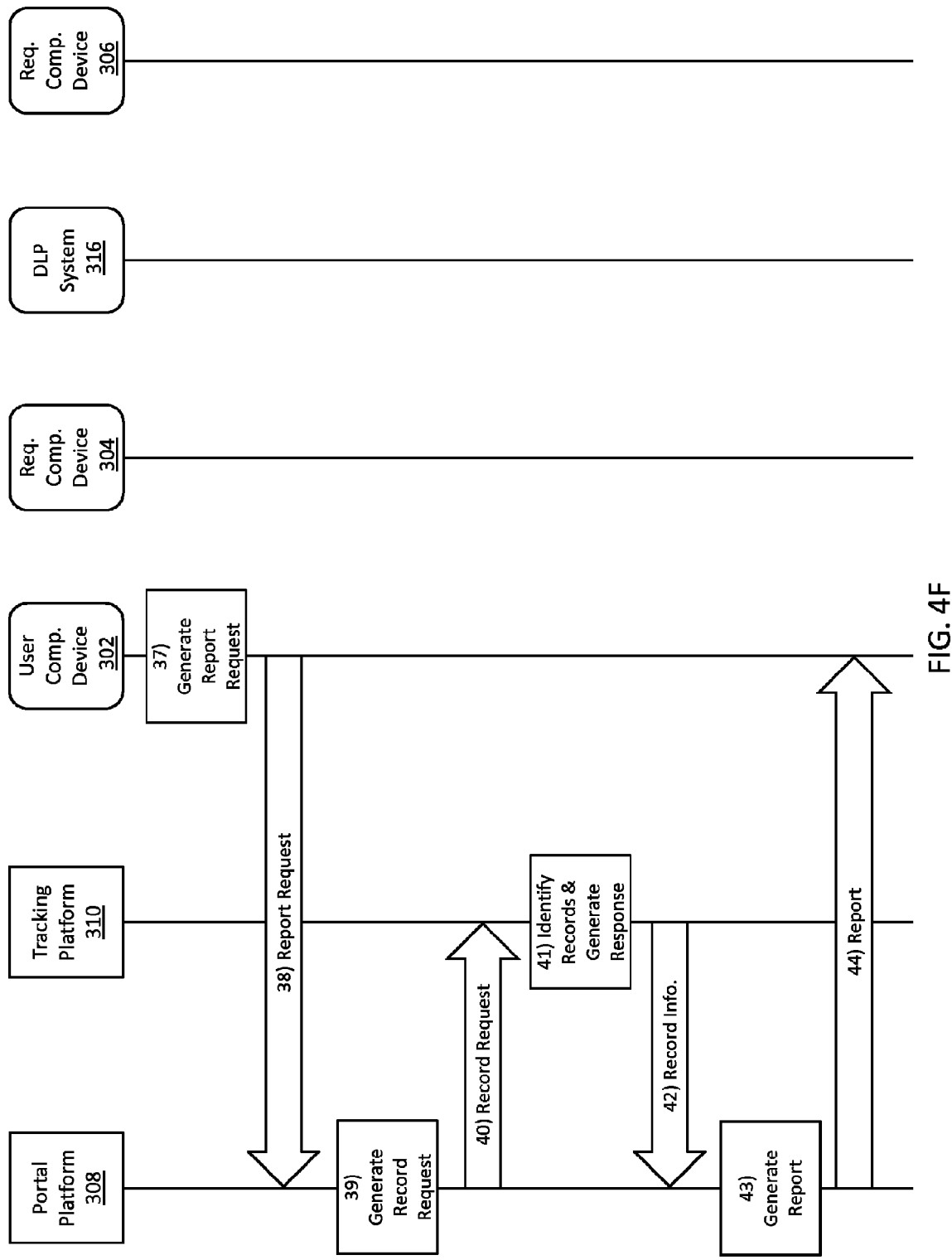

Referring to FIG. 4F, at step 37, user computing device 302 may generate a request for a report describing dissemination of the application data file. For example, the user of user computing device 302 may desire to see a report describing dissemination (e.g., who and/or where has the application data file been opened and/or viewed). At step 38, user computing device 302 may communicate the request for the report describing dissemination of the application data file to portal computing platform 308, which may receive the request for the report describing dissemination of the application data file (e.g., via communication interface 322). At step 39, portal computing platform 308 may generate a request for records (or information contained therein) associated with the application data file, and, at step 40, may communicate (e.g., via communication interface 322) the request for records associated with the application data file to tracking computing platform 310, which may receive the request for records associated with the application data file (e.g., via communication interface 332). At step 41, tracking computing platform 310 may identify (e.g., based on the identifier for the application data file) one or more records associated with the application data file (e.g., the records generated in steps 25 and 36), and, at step 42, may communicate (e.g., via communication interface 332) the records (or information contained therein) to portal computing platform 308, which may receive (e.g., via communication interface 322) the records (or information contained therein).

Figure 7:
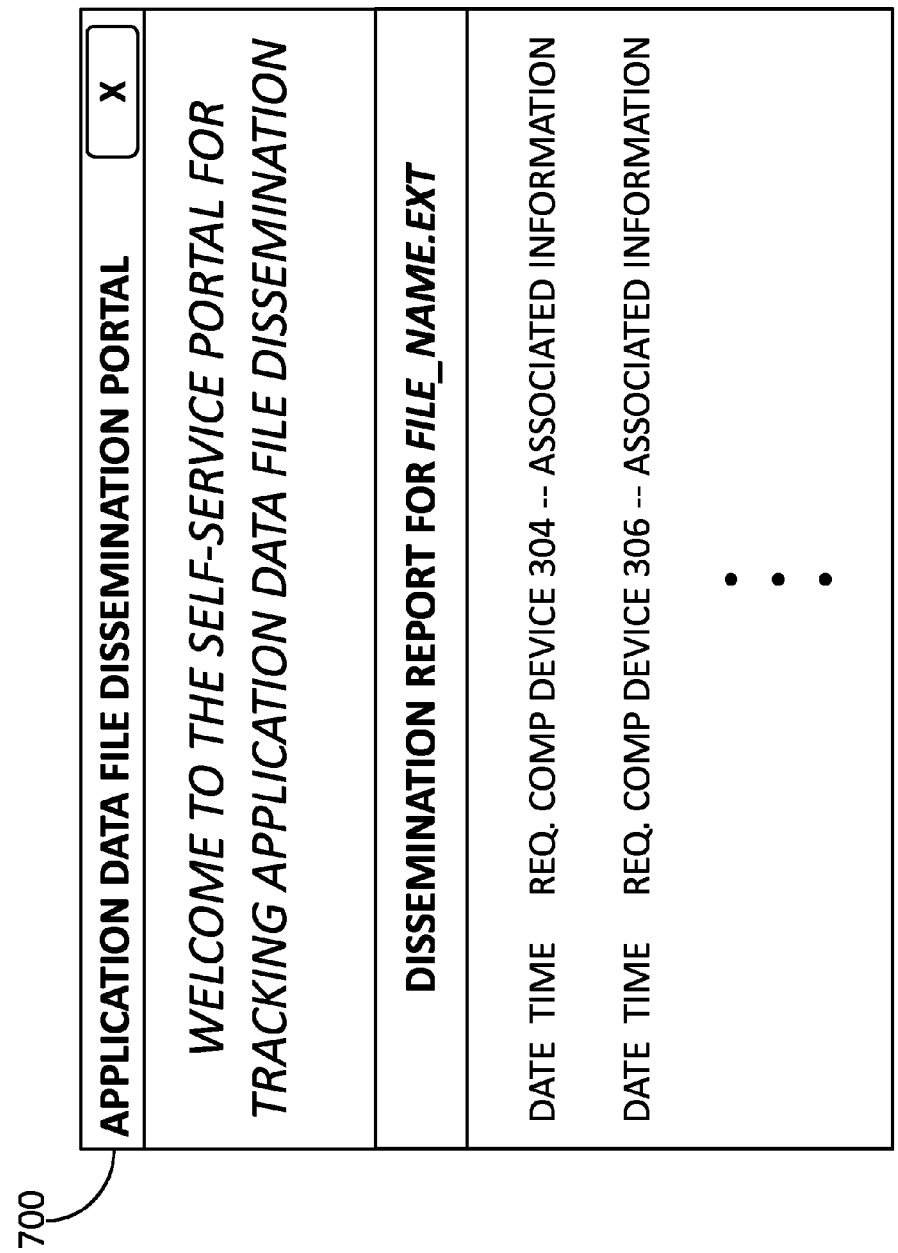
FIG. 7 depicts an example report describing dissemination of an application data file in accordance with one or more example embodiments.

At step 43, portal computing platform 308 may generate the report describing dissemination of the application data file. For example, portal computing platform 308 may generate a report similar to the report included in graphical user interface 700, depicted in FIG. 7. As illustrated by the report included in graphical user interface 700, the report may include information associated with the opening and/or viewing of the application data file by various computing devices. For example, the report may include an entry corresponding to requesting computing device 304 and/or an entry corresponding to requesting computing device 306. The entry corresponding to requesting computing device 304 may include the date/time stamp indicating the date and/or time the request for the data associated with the element stored on the storage device of tracking computing platform 310 was received by tracking computing platform 310 from requesting computing device 304, the identifier for the application data file, and/or information associated with requesting computing device 304 (e.g., the network address associated with requesting computing device 304, and/or the parameters associated with requesting computing device 304 (e.g., the one or more environment variables of requesting computing device 304 and/or the one or more elements of identifying information stored in the cookie on requesting computing device 304)). Similarly, the entry corresponding to requesting computing device 306 may include the date/time stamp indicating the date and/or time the request for the data associated with the element stored on the storage device of tracking computing platform 310 was received by tracking computing platform 310 from requesting computing device 306, the identifier for the application data file, and/or information associated with requesting computing device 306 (e.g., the network address associated with requesting computing device 306, and/or the parameters associated with requesting computing device 306 (e.g., the one or more environment variables of requesting computing device 306 and/or the one or more elements of identifying information stored in the cookie on requesting computing device 306)). Returning to FIG. 4F, at step 44, portal computing platform 308 may communicate (e.g., via communication interface 322) the report describing dissemination of the application data file to user computing device 302. As will be appreciated, multiple types of reports describing dissemination of one or more application data files may be generated. For example, a user may request a report describing dissemination of a specific application data file (e.g., an application data file previously submitted by the user to portal computing platform 308). Additionally or alternatively, an administrator may request a report describing dissemination of multiple application data files (e.g., files disseminated during a particular time range, files designated for internal use, and/or files designated as confidential). As will further be appreciated, the subject matter described herein may assist an organization in identifying who disclosed confidential information and/or may assist an organization in tracking the trajectory of confidential and/or proprietary information (e.g., in the event that confidential data is disseminated to one or more unauthorized parties, document tracking may provide a chain of custody for identification of a disclosure path).

Figure 8:
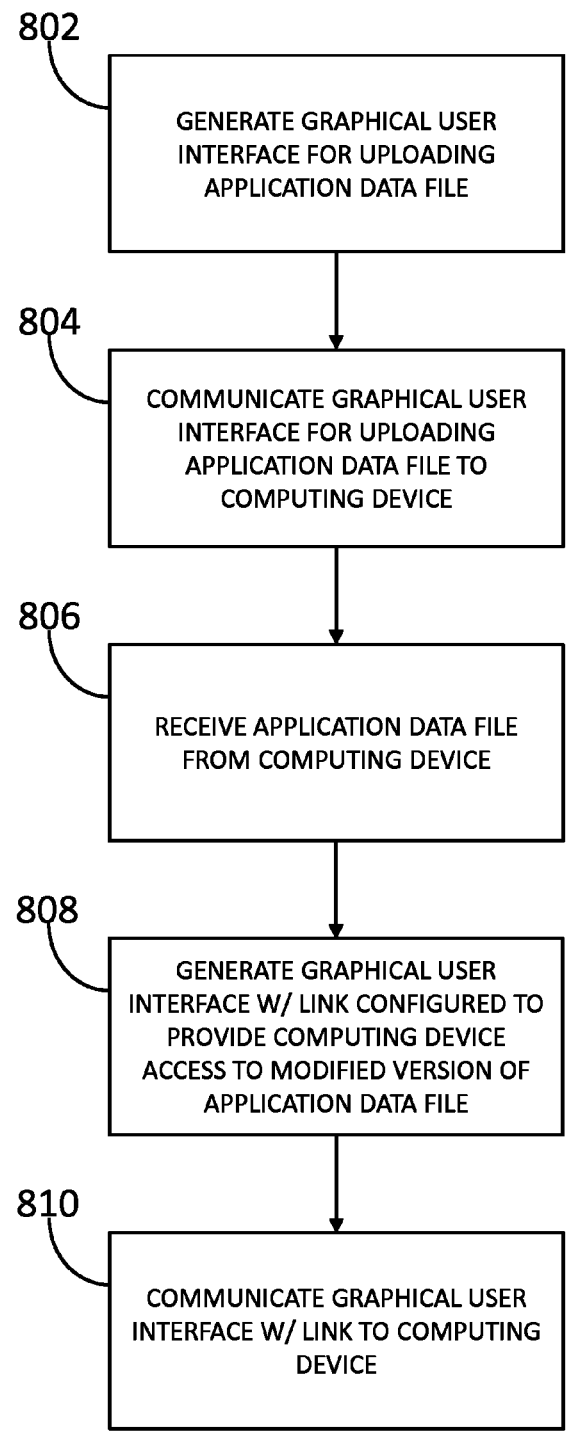
FIG. 8 depicts an illustrative method for utilizing a self-service portal to track dissemination of an application data file in accordance with one or more example embodiments.

FIG. 8 depicts an illustrative method for utilizing a self-service portal to track dissemination of an application data file in accordance with one or more example embodiments. Referring to FIG. 8, at step 802, a graphical user interface for uploading an application data file may be generated by a computing platform. For example, portal computing platform 308 may generate a graphical user interface similar to graphical user interface 500. At step 804, the computing platform may communicate the graphical user interface for uploading the application data file to a computing device. For example, portal computing platform 308 may communicate graphical user interface 500 to user computing device 302. At step 806, the computing platform may receive the application data file from the computing device. For example, a user of user computing device 302 may utilize graphical user interface 500 to upload an application data file to portal computing platform 308. At step 808, a graphical user interface comprising a link configured to provide the computing device with access to a modified version of the application data file that comprises an element for tracking dissemination of the application data file may be generated by the computing platform. For example, portal computing platform 308 may generate a graphical user interface similar to graphical user interface 600. At step 810, the computing platform may communicate the graphical user interface comprising the link configured to provide the computing device with access to the modified version of the application data file that comprises the element for tracking dissemination of the application data file to the computing device. For example, portal computing platform 308 may communicate graphical user interface 600 to user computing device 302.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A method comprising:
at a computing platform comprising at least one processor, a memory, and a communication interface:
generating, by the at least one processor, a graphical user interface for uploading an application data file;
communicating, via the communication interface and to a computing device, the graphical user interface for uploading the application data file;
receiving, via the communication interface and from the computing device, the application data file;

generating, by the at least one processor, a graphical user interface comprising a link configured to provide the computing device with access to a modified version of the application data file that comprises an element for tracking dissemination of the application data file; and communicating, via the communication interface and to the computing device, the graphical user interface comprising the link configured to provide the computing device with access to the modified version of the application data file that comprises the element for tracking dissemination of the application data file, wherein generating the graphical user interface for uploading the application data file comprises generating a graphical user interface for uploading the application data file that comprises a selectable option for designating whether the application data file is at least one of intended for internal use or external use and confidential or proprietary, the method comprising:

receiving, via the communication interface and from the computing device, data, generated based on an option selected using the selectable option for designating whether the application data file is at least one of intended for internal use or external use and confidential or proprietary, that indicates at least one of whether the application data file is intended for internal use or external use and whether the application data file is confidential or proprietary; and generating, by the at least one processor and based on the data that indicates whether the application data file is at least one of intended for internal use or external use and whether the application data file is confidential or proprietary, a request for the modified version of the application data file that comprises the element for tracking dissemination of the application data file, wherein the request for the modified version of the application data file indicates the at least one of whether the application data file is intended for internal use or external use and whether the application data file is confidential or proprietary, wherein the data that indicates whether the application data file is at least one of intended for internal use or external use and whether the application data file is confidential or proprietary indicates that the application data file is at least one of intended for internal use and confidential or proprietary, the method comprising:

detecting, by a data leak prevention (DLP) system associated with an organization that is associated with the computing platform, outbound data that comprises at least a portion of the element for tracking dissemination of the application data file and that is destined for a network address that is not associated with the organization; and responsive to detecting the outbound data that comprises the at least a portion of the element for tracking dissemination of the application data file and that is destined for the network address that is not associated with the organization, preventing, by the DLP system associated with the organization, the outbound data that comprises the at least a portion of the element for tracking dissemination of the application data file from being communicated to the network address that is not associated with the organization, wherein detecting the outbound data that comprises the at least a portion of the element for tracking dissemination of the application data file and that is destined for the network address that is not associated with the organization comprises detecting an email message that comprises the at least a portion of the element for tracking dissemination of the application data file and that is destined for the network address that is not associated with the organization, and wherein preventing the outbound data that comprises the at least a portion of the element for tracking dissemination of the application data file from being communicated to the network address that is not associated with the organization comprises preventing transmission of the email message that comprises the at least a portion of the element for tracking dissemination of the application data file and that is destined for the network address that is not associated with the organization to the network address that is not associated with the organization.

2. A method comprising:

at a computing platform comprising at least one processor, a memory, and a communication interface:

generating, by the at least one processor, a graphical user interface for uploading an application data file;

communicating, via the communication interface and to a computing device, the graphical user interface for uploading the application data file;

receiving, via the communication interface and from the computing device, the application data file;

generating, by the at least one processor, a graphical user interface comprising a link configured to provide the computing device with access to a modified version of the application data file that comprises an element for tracking dissemination of the application data file; and communicating, via the communication interface and to the computing device, the graphical user interface comprising the link configured to provide the computing device with access to the modified version of the application data file that comprises the element for tracking dissemination of the application data file, wherein generating the graphical user interface for uploading the application data file comprises generating a graphical user interface for uploading the application data file that comprises a selectable option for designating whether the application data file is at least one of intended for internal use or external use and confidential or proprietary, the method comprising:

receiving, via the communication interface and from the computing device, data, generated based on an option selected using the selectable option for designating whether the application data file is at least one of intended for internal use or external use and confidential or proprietary, that indicates at least one of whether the application data file is intended for internal use or external use and whether the application data file is confidential or proprietary; and generating, by the at least one processor and based on the data that indicates whether the application data file is at least one of intended for internal use or external use and whether the application data file is confidential or proprietary, a request for the modified version of the application data file that comprises the element for tracking dissemination of the application data file, wherein the request for the modified version of the application data file indicates the at least one of whether the application data file is intended for internal use or external use and whether the application data file is confidential or proprietary,
wherein the data that indicates whether the application data file is at least one of intended for internal use or external use and whether the application data file is confidential or proprietary indicates that the application data file is at least one of intended for internal use and confidential or proprietary, the method comprising:
  detecting, by a data leak prevention (DLP) system associated with an organization that is associated with the computing platform, outbound data that comprises at least a portion of the element for tracking dissemination of the application data file and that is destined for a network address that is not associated with the organization; and
  responsive to detecting the outbound data that comprises the at least a portion of the element for tracking dissemination of the application data file and that is destined for the network address that is not associated with the organization, preventing, by the DLP system associated with the organization, the outbound data that comprises the at least a portion of the element for tracking dissemination of the application data file from being communicated to the network address that is not associated with the organization,
wherein detecting the outbound data that comprises the at least a portion of the element for tracking dissemination of the application data file and that is destined for the network address that is not associated with the organization comprises detecting one or more data packets that comprise the at least a portion of the element for tracking dissemination of the application data file and that are destined for the network address that is not associated with the organization, and wherein preventing the outbound data that comprises the at least a portion of the element for tracking dissemination of the application data file from being communicated to the network address that is not associated with the organization comprises preventing transmission of the one or more data packets that comprise the at least a portion of the element for tracking dissemination of the application data file and that are destined for the network address that is not associated with the organization to the network address that is not associated with the organization.

3. The method of claim 2, wherein detecting the one or more data packets that comprise the at least a portion of the element for tracking dissemination of the application data file and that are destined for the network address that is not associated with the organization comprises:
  utilizing deep packet inspection (DPI) to analyze a plurality of data packets destined for one or more network addresses that are not associated with the organization; and
  identifying, based on results of the DPI and from amongst the plurality of data packets destined for the one or more network addresses that are not associated with the organization, the one or more data packets that comprise the at least a portion of the element for tracking dissemination of the application data file and that are destined for the network address that is not associated with the organization.

4. A method comprising:
at a computing platform comprising at least one processor, a memory, and a communication interface:
  generating, by the at least one processor, a graphical user interface for uploading an application data file;
  communicating, via the communication interface and to a computing device, the graphical user interface for uploading the application data file;
  receiving, via the communication interface and from the computing device, the application data file;
  generating, by the at least one processor, a graphical user interface comprising a link configured to provide the computing device with access to a modified version of the application data file that comprises an element for tracking dissemination of the application data file;
  communicating, via the communication interface and to the computing device, the graphical user interface comprising the link configured to provide the computing device with access to the modified version of the application data file that comprises the element for tracking dissemination of the application data file;
  generating, by the at least one processor, a request for the modified version of the application data file that comprises the element for tracking dissemination of the application data file, wherein the request comprises data from the application data file;
  communicating, via the communication interface and to a different computing platform, the request for the modified version of the application data file that comprises the element for tracking dissemination of the application data file;
  receiving, by the different computing platform, the request for the modified version of the application data file that comprises the element for tracking the dissemination of the application data file;
  generating, by at least one processor of the different computing platform, the modified version of the application data file that comprises the element for tracking dissemination of the application data file;
  receiving, via the communication interface and from the different computing platform, the modified version of the application data file that comprises the element for tracking dissemination of the application data file, wherein generating the modified version of the application data file that comprises the element for tracking dissemination of the application data file comprises:
    determining, by the at least one processor of the different computing platform, an identifier for the application data file; and
    utilizing, by the at least one processor of the different computing platform, the data from the application data file to generate a version of the application data file that comprises: a reference to an element stored on a storage device of the different computing platform, and metadata comprising the identifier for the application data file;
  receiving, by the different computing platform and from a requesting computing device, a request for data associated with the element stored on the storage device of the different computing platform, wherein the request comprises the identifier for the application data file;
  generating, by the at least one processor of the different computing platform, a record comprising information associated with the requesting computing device and the identifier for the application data file;

generating, by the at least one processor of the different computing platform, a request for one or more parameters associated with the requesting computing device; and receiving, by the different computing platform and from the requesting computing device, the one or more parameters associated with the requesting computing device, and wherein generating the record comprising the information associated with the requesting computing device and the identifier for the application data file comprises generating a record comprising the one or more parameters associated with the requesting computing device, wherein generating the request for the one or more parameters associated with the requesting computing device comprises generating a request for at least one of one or more environment variables of the requesting computing device and one or more elements of identifying information stored in a cookie on the requesting computing device, wherein receiving the one or more parameters associated with the requesting computing device comprises receiving the at least one of the one or more environment variables of the requesting computing device and the one or more elements of identifying information stored in the cookie on the requesting computing device, and wherein generating the record comprising the information associated with the requesting computing device and the identifier for the application data file comprises generating a record comprising the at least one of the one or more environment variables of the requesting computing device and the one or more elements of identifying information stored in the cookie on the requesting computing device.

* * * * *